United States Patent
Ward

(10) Patent No.: US 6,754,170 B1
(45) Date of Patent: Jun. 22, 2004

(54) TIMING SYNCHRONIZATION IN OFDM COMMUNICATIONS RECEIVERS

(75) Inventor: Robert Ward, Poway, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 747 days.

(21) Appl. No.: 09/675,955

(22) Filed: Sep. 29, 2000

(51) Int. Cl.[7] .................................................. H04J 1/00
(52) U.S. Cl. ...................... 370/208; 370/503; 370/343; 375/354
(58) Field of Search ................................ 370/480, 208, 370/203, 343, 514, 484, 210, 206, 503, 509, 510, 511, 512, 513; 375/260, 219, 346, 222, 231, 232, 340, 348, 354, 356, 365, 366, 368

(56) References Cited

U.S. PATENT DOCUMENTS

| | | | |
|---|---|---|---|
| 5,581,578 A | * 12/1996 | De Bot | 375/261 |
| 6,002,925 A | 12/1999 | Vu et al. | 455/313 |
| 6,169,751 B1 | * 1/2001 | Shirakata et al. | 370/480 |
| 6,215,819 B1 | * 4/2001 | Hyakudai et al. | 375/240 |
| 6,304,611 B1 | * 10/2001 | Miyashita et al. | 375/260 |
| 6,459,679 B1 | * 10/2002 | Kim | 370/208 |
| 6,539,063 B1 | * 3/2003 | Peyla et al. | 375/267 |
| 6,587,526 B1 | * 7/2003 | Li et al. | 375/355 |
| 6,611,551 B1 | * 8/2003 | Jones et al. | 375/219 |
| 6,658,063 B1 | * 12/2003 | Mizoguchi et al. | 375/260 |

* cited by examiner

*Primary Examiner*—Ajit Patel
(74) *Attorney, Agent, or Firm*—Williams, Morgan & Amerson

(57) ABSTRACT

An orthogonal frequency division multiplexing (OFDM) receiver is synchronized to a received signal during one of the short symbols of the preamble of the OFDM signal, using a timing synchronizing circuit that derives timing information from timing components generated by a constellation processing circuit which generates the timing components from frequency domain components obtained by performing a Fourier transform on the OFDM signal.

13 Claims, 6 Drawing Sheets

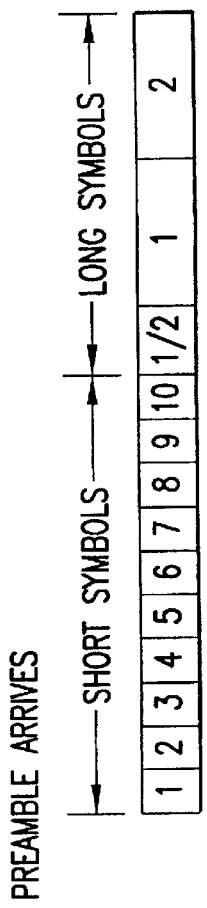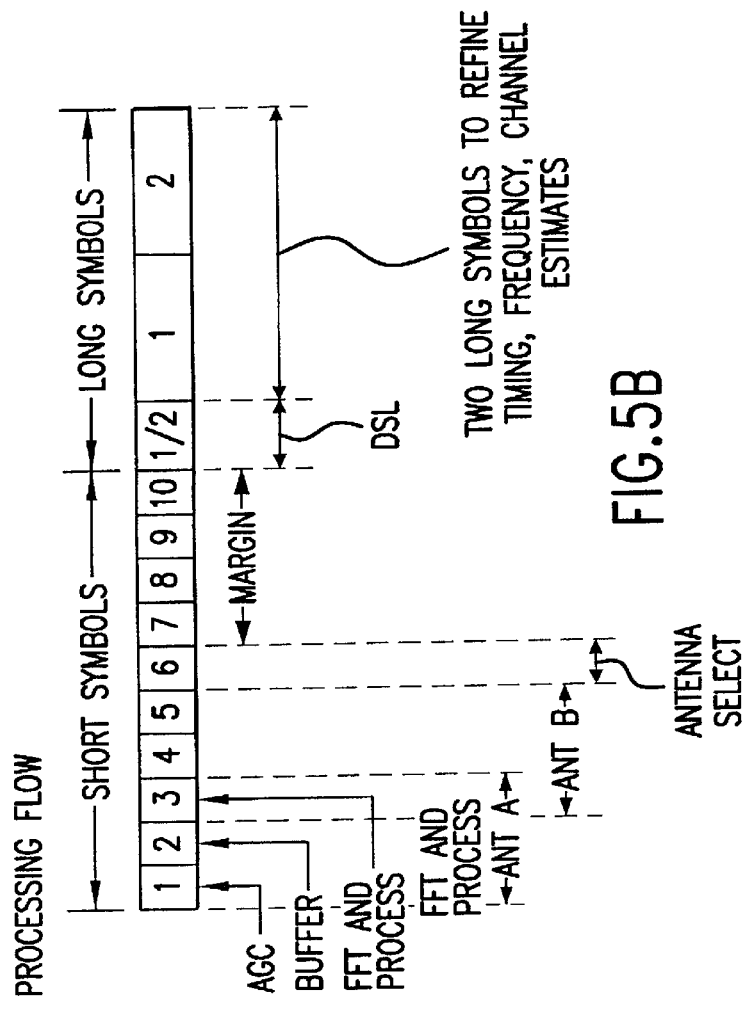

TIMING SYNCHRONIZATION IN OFDM COMMUNICATIONS RECEIVERS

BACKGROUND OF THE INVENTION

1. Field of the Invention

The apparatus and methods consistent with the present invention generally relate to orthogonal frequency division multiplexing (OFDM) communications systems and, more particularly, to achieving faster timing synchronization in an OFDM receiver.

2 Description of the Prior Art

A. Wireless Networks

A wireless local area network (LAN) typically uses infrared (IR) or radio frequency (RF) communications channels to communicate between portable or mobile computer terminals and stationary access points or base stations. These access points are, in turn, connected by a wired or wireless communications channel to a network infrastructure which connects groups of access points together to form the LAN, including, optionally, one or more host computer systems.

Wireless IR and RF protocols are known which support the logical interconnections of such portable roaming terminals having a variety of types of communication capabilities to host computers. The logical interconnections are based upon an infrastructure in which at least some of the terminals are capable of communicating with at least two of the access points when located within a predetermined range therefrom, each terminal being normally associated, and in communication, with a single one of such access points. Based on the overall spatial layout, response time, and loading requirements of the network, different networking schemes and communication protocols have been designed so as to most efficiently regulate the communications.

One such protocol is described in U.S. Pat. Nos. 5,029,183; 5,142,550; 5,280,498; and 5,668,803, each assigned to the assignee of this application and incorporated herein by reference. Still another protocol is set forth in the IEEE Standard 802.11 entitled "Wireless LAN Medium Access Control (MAC) and Physical Layer (PHY) Specifications" available from the IEEE Standards Department, Piscataway, N.J. (hereinafter, the "IEEE 802.11 Standard").

IEEE Project 802 is concerned with network architecture for LANs. The IEEE 802.11 Standard is directed to wireless LANs, and in particular specifies the MAC and the PHY layers. These layers are intended to correspond closely to the two lowest layers of the ISO Basic Reference Model of OSI, i.e., the data link layer and the physical layer.

The IEEE 802.11 Standard permits either IR or RF communications at 1 Mbps, 2 Mbps and higher data rates, a medium access technique similar to carrier sense multiple access/collision avoidance (CSMA/CA), a power-save mode for battery-operated mobile stations, seamless roaming in a full cellular network, high throughput operation, diverse antenna systems designed to eliminate "dead spots", and an easy interface to existing network infrastructures.

In Europe, the European Telecommunications Standards Institute (ETSI) has been working on HIPERLAN (European HIgh PERformance LAN), the next generation of high speed wireless systems. The frequency spectrum for HIPERLAN in the 5 GHz and 17 GHz bands has been allocated by the European Conference of Postal and Telecommunications Administrations (CEPT), with a data rate of over 20 Mbit/sec.

B. Spread Spectrum Modulation Techniques

The current implementations of commercial wireless LANs utilize a radio operating in the 2.4 to 2.4835 GHz spread spectrum band which is the industrial, scientific, and medical (ISM) band allocated for unlicenced use by the Federal Communications Commission (FCC). The current systems utilize one of two basic types of spread spectrum modulation: direct-sequence and frequency-hopping. In the description that follows, the specific modulation parameters specified by the IEEE 802.11 Standard shall be used to illustrate the different modulation techniques.

In a direct-sequence spread spectrum (DSSS) system, each binary bit of data in a data signal is spread over each of 11 discrete frequency channels at the same time, i.e., an 11-bit pseudo-random noise (PN) code. The data of each user is coded using a different PN code so that the signals of different users are orthogonal to each other. Thus, another user's signal is merely interpreted as noise. The IEEE 802.11 Standard provides two modulation formats and data rates in the DSSS system—a basic access rate using differential binary phase shift keying (DBPSK) modulation operating at 1 Mbps, and an enhanced access rate using differential quadrature phase shift keying (DQPSK) modulation operating at 2 Mbps.

In a frequency-hopping spread spectrum (FHSS) system, each binary bit of data in the data signal is associated with a group of distinct "chips", or discrete signal frequency output, in different parts of a frequency band, with a minimum hop of at least 6 MHZ (in North America/Europe). The chipping pattern or hopping sequence is a pseudo-random sequence uniformly distributed throughout the band and set forth in the IEEE 802.11 Standard. Each access point executes a unique hopping pattern across 79 non-overlapping frequencies at a rate of one hop every 100 milliseconds. There are three sets of hopping patterns specified in the IEEE 802.11 Standard for North American/European operations, with each set containing 26 sequences. The sets are selected to minimize the possibility of interference. The RF modulation technique used in the FHSS system is 2-level or 4-level Gaussian filtered frequency shift keying (GFSK). Frequency-hopping spread spectrum systems are currently preferred over direct-sequence for most applications by the majority of users as they allow increased capacity and decreased interference.

The IEEE 802.11 FHSS systems hop over channels with an effective raw data rate of 1 Mbps or 2 Mbps. Current commercial systems can typically cover from an area of 25,000 to 70,000 square feet with a process gain of 10 dB. The relatively low power output used in such systems is a consequence of limits placed by regulatory agencies. Power output standards currently in effect limit the power output to either 100 mW, 230 mW, or 500 mW depending on the country.

In a spread spectrum system, one can multiplex users by assigning them different spreading keys. Such a system is called a code division multiple access (CDMA) system. Most wireless LANs are not CDMA systems since users belonging to the same wireless LAN utilize the same spreading key. Instead, as noted above, the MAC set forth in the IEEE 802.11 Standard provides that use access to the channel is multiplexed in time using nearly the same Carrier Sense Multiple Access (CSMA) protocol as in the Ethernet.

The CDMA modulation technique is one of several techniques for facilitating communications in which a large number of system users is present. The use of CDMA in a digital cellular spread spectrum communications system was adopted by the Telecommunication Industry Association in 1993 as standard IS-95. Other multiple access communications system techniques, such as time division multiple access (TDMA), frequency division multiple access (FDMA), and AM modulation schemes such as amplitude companded single sideband (ACSSB) are known in the art. The use of CDMA techniques in a multiple access communication system is disclosed in U.S. Pat. No. 4,901,307.

C. OFDM Communications Systems

The IEEE 802.1a Standard also specifies the PHY layer operating in the 5 GHz band, which is open to unlicensed devices in the U.S. The IEEE 802.11a Standard is based on orthogonal frequency division multiplexing (OFDM) to modulate the data. Digital data is divided among a large number of adjacent carriers so that a relatively small amount of data is carried on each carrier. Adjacent carriers are mathematically orthogonal. Their sidebands may overlap but signals can be received without adjacent carrier interference. The main benefit of OFDM modulation is its robustness to multipath echoes, which are encountered in the indoor and mobile environments. Each OFDM symbol is composed of fifty-two non-zero subcarriers of which forty-eight are data subcarriers and the remaining four are carrier pilot subcarriers. The PHY specifications encompass data rates from 6 Mbit/s up to 54 Mbit/s, with 20 MHZ spacing between adjacent channels. All implementations are required to support 6, 12 and 24 Mbit/s. Optional extensions are for 9, 18, 36, 48 and 54 Mbit/s. The range of data rates is provided to match the wide range of radio channel characteristics in both indoor and outdoor environments. The multirate mechanism of the MAC protocol ensures that all devices communicate with each other at the best data rate in the present channel.

In a conventional single-carrier digital communication system, data symbols are transmitted serially using some modulation scheme, and the spectrum of each symbol is allowed to occupy the entire channel bandwidth. In multi-carrier modulation schemes, data symbols are transmitted in parallel on multiple subcarriers that share the channel bandwidth using some form of frequency-division multiplexing (FDM). The modulation scheme on one subcarrier may be chosen independent of that used on other subcarriers. Thus, subcarriers in frequency segments of the channel with a high signal-to-noise ratio (SNR) may use high-rate modulation, while those with degraded SNR use low-rate modulation, or are not modulated. Systems which adaptively load the subcarriers differently depending on the spectral shaping of the channel are common in wired applications such as asymmetric digital subscriber lines (ADSL), and the technique is usually referred to as discrete multitone or DMT. DMT systems have been widely analyzed and reported in the prior art.

In OFDM the spectra of the subcarriers overlap, and their spacing is chosen so that each subcarrier is orthogonal to all other subcarriers. The common method of obtaining orthogonality of subcarriers is to choose their frequency spacing equal to the inverse of the subcarrier symbol duration. Baseband processing of the OFDM signal is then conveniently effected using the discrete Fourier transform, implemented as an inverse fast Fourier transform (IFFT) and a fast Fourier transform (FFT) that modulate and demodulate parallel data blocks, respectively. The set of subcarriers generated during one transform defines an OFDM symbol. The subcarriers are conveyed by serial transmission over the channel of the time samples generated by the IFFT. The duration of the OFDM symbol, which is the same as that of the subcarrier symbol, is thus equal to the time window of the transform.

Various techniques for compensating for local oscillator errors in an OFDM system are described in the known art. For example, U.S. Pat. No. 5,838,734 describes a receiver in which the phase errors in a received OFDM signal are analyzed and corrected phase values derived. In particular, U.S. Pat. No. 5,838,734 discloses an FFT with outputs for the I and Q values of each of the carriers which were originally encoded at the transmitter. These pass to a converter which derives the magnitude Z for each vector from the quadrature amplitude modulation (QAM) phase diagram which they represent. These I and Q values also pass to a converter which derives an angle for each vector in the QAM phase diagram and supplies this to a phase error analyzer as well as to a phase error compensator. The phase error analyzer removes phase noise due to the local oscillator, and the phase angles are then corrected in the phase error compensator to provide a corrected output.

An OFDM signal includes a preamble followed by a signal symbol and a variable number of data symbols. The preamble includes ten so-called "short" symbols (for example, each of duration t=0.8 $\mu$s), followed by a single so-called "medium" symbol (for example, of duration t=1.6 $\mu$s), followed by two so-called "long" symbols (for example, each of duration t=3.2 $\mu$s).

When the OFDM signal is received, various functions are performed during the receipt of the symbols in the preamble. One of these functions is timing synchronization and is the main function with which the instant invention is concerned.

In the prior art, two of the short symbols are correlated to obtain a peak whose time of occurrence is compared to a reference time, thereby establishing timing information. However, the use of two short symbols for obtaining timing information is too much time for some applications. For example, some OFDM receivers have two antennas, and it is desired to select one for the OFDM signal reception. Typically, for the first antenna, one short symbol is used for automatic gain control, another short symbol is used for buffering, and two more short symbols are used for the timing. The same usage of symbols is needed for the second antenna, and still another short symbol is needed for selection between the antennas. There are very few short symbols left in the preamble and, hence, little time to repeat any of the above functions, especially in the event of bad channel selection.

SUMMARY OF INVENTION

Objects of the Invention

It is a general object of the present invention to provide an improved communications receiver for use in orthogonal frequency division multiplexing communications systems.

It is another object of the invention to provide optimum timing synchronization in an OFDM communications receiver.

It is a further object of the present invention to provide fast antenna selection in an OFDM communications receiver.

It is an even further object of the invention to provide an arrangement and methods which can be used to accomplish one or more of the above objectives.

Additional objects, advantages and novel features of the present invention will become apparent to those skilled in the art from this disclosure, including the following detailed description, as well as by practice of the invention. While the invention is described below with reference to preferred embodiments, it should be understood that the invention is not limited thereto. Those of ordinary skill in the art having access to the teachings herein will recognize additional applications, modifications and embodiments in other fields, which are within the scope of the invention as disclosed and claimed herein and with respect to which the invention could be of significant utility.

Features of the Invention

Briefly, and in general terms, the invention relates to a method of synchronizing a receiver to a received orthogonal frequency division multiplexing (OFDM) signal having a preamble with short and long duration symbols, comprising the steps of converting the received OFDM signal by fast Fourier transform to frequency domain components; processing the frequency domain components to timing components; deriving timing information from the timing components; applying the timing information to the received OFDM signal to synchronize the receiver; and all of said steps being performed during one of the short symbols.

Another feature of this invention is embodied in a method of antenna selection in a dual antenna receiver for receiving an orthogonal frequency division multiplexing (OFDM) signal having a preamble with short and long duration symbols, comprising the steps of converting an OFDM signal received by a first antenna by fast Fourier transform to frequency domain components; processing the frequency domain components to timing components; deriving timing information from the timing components; applying the timing information to the received OFDM signal to synchronize the receiver; analyzing a signal-to-noise ratio (SNR) of the OFDM signal received by the first antenna of the synchronized receiver during one of the short symbols; repeating the aforementioned steps for a second antenna during another of the short symbols; and selecting the antenna which has a higher SNR during another of the short symbols.

Yet another feature of this invention resides in an arrangement for synchronizing a receiver to a received orthogonal frequency division multiplexing (OFDM) signal having a preamble with short and long duration symbols, comprising a Fourier transform (FT) circuit for converting the received OFDM signal to frequency domain components; a constellation processing (CP) circuit connected to the FT circuit, for processing the frequency domain components to timing components; and a timing synchronizing circuit connected to the CP circuit, and operative for deriving timing information from the timing components, and for applying the timing information to the received OFDM signal to synchronize the receiver during one of the short symbols.

The novel features and characteristics of the invention are set forth in the appended claims. The invention itself, however, as well as other features and advantages thereof, will be best understood by reference to a detailed description of a specific embodiment, when read in conjunction with the accompanying drawings.

BRIEF DESCRIPTION OF THE DRAWING

FIG. 5A is representation of a sequence of symbols in a preamble of an OFDM symbol structure known in the prior art; and FIG. 5B is a representation of the processing flow over the sequence of symbols in FIG. 5A according to the present invention.

DESCRIPTION OF THE PREFERRED EMBODIMENT

Definitions

As used herein, the following terms have the following meanings:

"Channel rate" is the bit rate of a particular stream, channel, etc., for example, a single television transmission, a file transfer, a database transaction.

"Link rate" is the bit rate which a network device (host, router, switch) can or must sustain over an individual link (pair of wires, coaxial cable, optical fiber). This rate is an upper bound on the channel rate. It also has a major influence on the cost of interface hardware and of network protocol hardware and software.

"Aggregate rate" is the maximum total network capacity, expressed as a sum of the link rates for the maximum number of links that may be transmitting simultaneously. For networks implemented as buses or rings or using single frequency wireless broadcasting, the link rate is identical to the aggregate rate. Conversely, conventional telephone switching systems provide aggregate rates much higher than the rate of any link.

Figure 1:
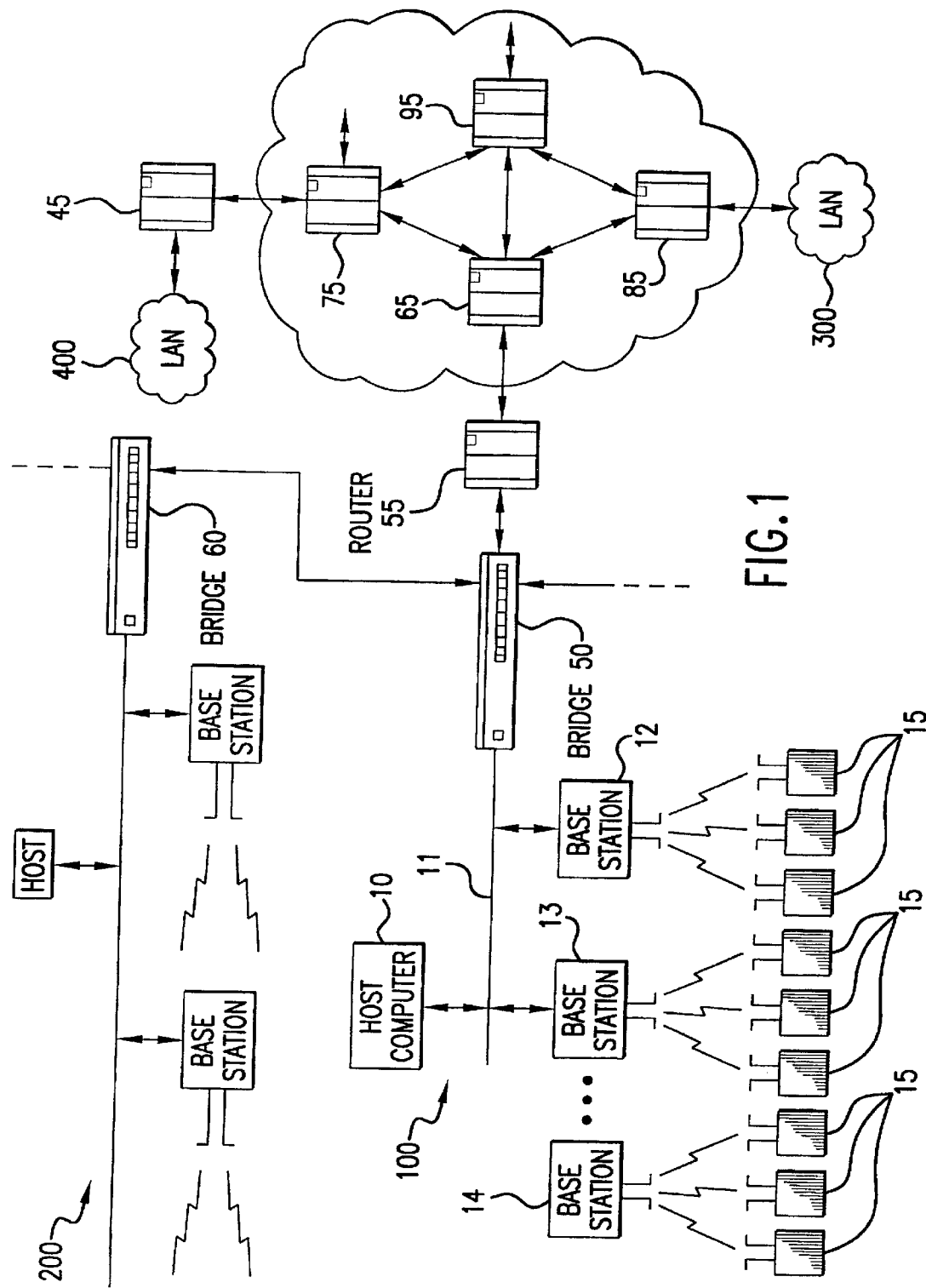
FIG. 1 is a diagram illustrating a wireless local area network in which the present invention may be implemented.

Referring now to the figures, FIG. 1 shows a data communications network according to one embodiment of the invention. A first local area network (LAN) 100 is illustrated, including a host computer or processor 10 which is connected by a wired communications link 11 to a number of stationary access points or base stations 12,13. Other base stations 14 can be coupled to the host computer 10 through the base stations 12, 13 or by an RF link. Each one of the base stations 12,13,14 is coupled by an RF link to a number of remote mobile units 15. In one embodiment, the remote mobile units 15 are hand-held, battery-operated data terminals or voice communication handsets such as described in U.S. Pat. No. 5,029,183; and U.S. Ser. No. 08/794,782, filed Feb. 3, 1997, and U.S. Ser. No. 09/008,710, filed Jan. 16, 1998, all assigned to the assignee of the instant application and incorporated herein by reference.

Various other types of remote terminals may be advantageously employed in a system having features of the invention. These remote terminals ordinarily would include data entry facilities such as a magnetic card reader or the like, as well as a display (or printer) for indicating to a user information detected, transmitted and/or received by the terminal. In this embodiment used as an illustrative example, there may be from one up to sixty-four of the base stations (three stations being shown in FIG. 1) and up to several hundred of the remote units. Of course, the network may be expanded by merely changing the size of address fields and the like in the digital system, as will appear, but a limiting factor is the RF traffic and attendant delays in waiting for a quiet channel.

The first LAN 100 may be coupled to additional LANs 200,300,400 etc. through controllers such as bridges 50, 60, etc. or routers 55, 65, 75, 85, 95, 45, etc. This communications network as seen in FIG. 1 would ordinarily be used in a manufacturing facility, office building complex, warehouse, retail establishment, or like commercial facility or combination of these facilities, where the data-gathering terminals would be used for inventory control in stockroom or receiving/shipping facilities, at checkout (point of sale) counters, for reading forms or invoices of the like, for personnel security checking at gates or other checkpoints, at time clocks, for manufacturing or process flow control, and many other such uses.

The mobile units 15 may advantageously be hand-held, laser scanning bar-code reader data terminals, or bar-code readers of the CCD or wand type, and may be portable or stationary, rather than hand-held. The mobile units 15 may also be voice communication handsets, pagers, still image or video cameras, or any combination of the foregoing. Other types of data gathering devices may be utilized as terminals and use the features of the invention, such as temperature, pressure, or other environmental measuring devices, event counters, voice or sound activated devices, intrusion detectors, etc.

More specifically, FIG. 1 illustrates a distributed computing environment or physical layer with clients and servers interconnected through a network link, although additional clients and servers as well as other types of nodes, may be distributed along the network link as well. As used in this specification, the term "client" will generally denote a user of some type. The term "server" includes any device directed for controlling and coordinating shared usage of a network resource, such as a storage disk or printer.

The next OSI layer, the data link layer, is directed to the transmission of data streams that enable communication among the nodes at the physical layer, and is commonly referred to as medium access. Bits of information are typically arranged in logical units known as frames or envelopes. These envelopes define the protocol which the physical nodes use to intercommunicate. Ethernet as defined in IEEE Standard 802.3, Token Ring as defined in IEEE Standard 802.5, and Fiber Distributed Data Interface (FDDI) are examples of popular frame/physical protocols used in networking systems. Typically, the envelopes are divided into segments including a header, a trailer, and a data segment. The header includes information such as the physical address of the destination node, which enables any given node to direct a communication to another specified node number. The trailer usually provides some type of parity or other data integrity check to ensure proper data transmission. Finally, the data segment includes the information embedded and passed down from the higher OSI layers. The network layer builds on the data link layer and is directed to the routing of information packets among the physical nodes.

Figure 2:
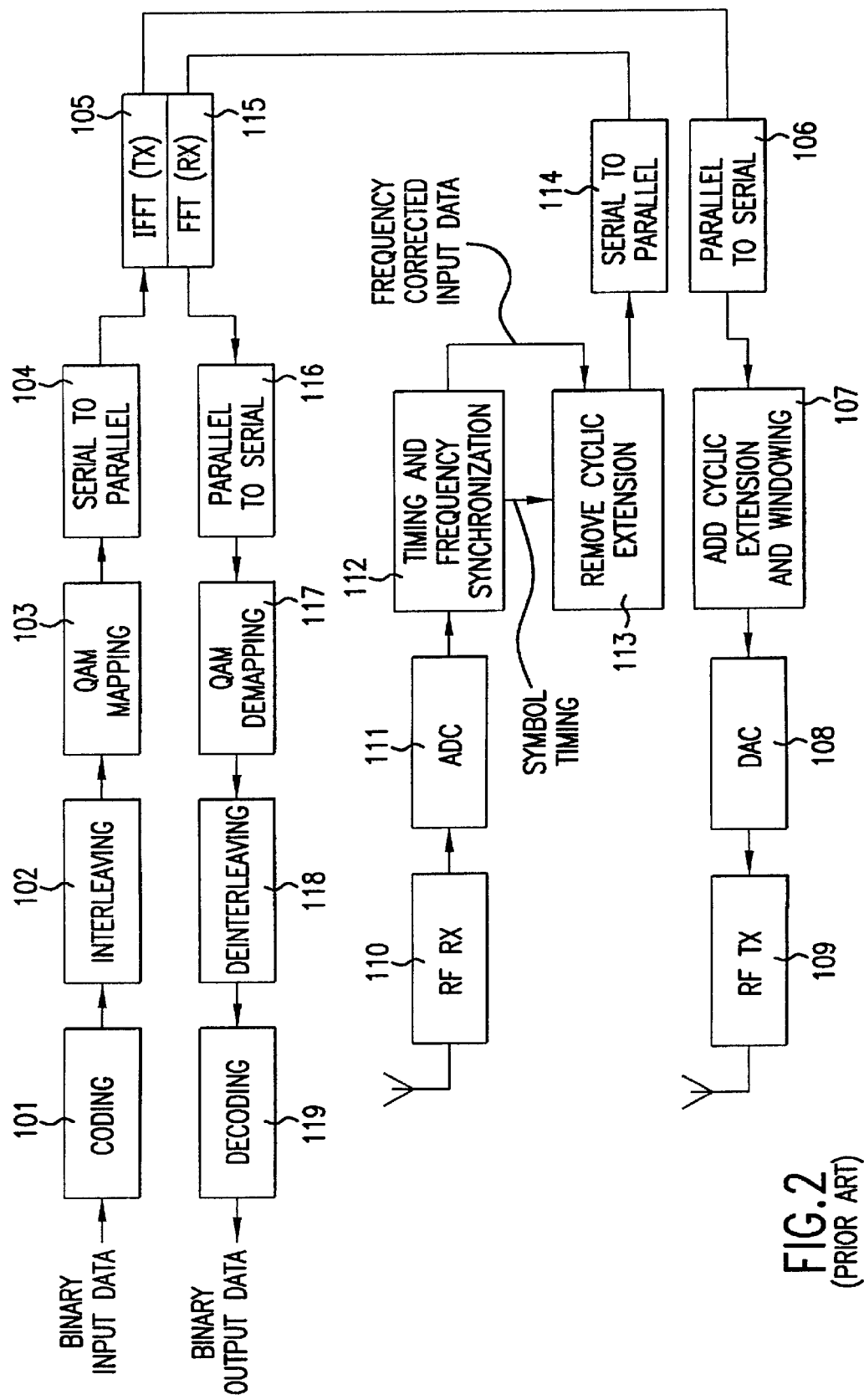
FIG. 2 is a block diagram of an OFDM transceiver known in the prior art.

FIG. 2 shows a block diagram of a typical OFDM transceiver known in the prior art. In a transmitter path, binary input data is first encoded using a convolutional encoder 101. The coding rate is ½ or 24 Mbit/s at a quadrature amplitude modulation (QAM) of 16 bits, or is ¾ or 36 Mbit/s at 16 QAM. The coding rate is ⅔ or 48 Mbit/s at 64 QAM, or is ¾ at 54 Mbit/s at 64 QAM.

The coded output data is interleaved at interleaver 102 to get the benefit of time and frequency diversity. After interleaving, the binary data is mapped on QAM symbols at a mapper 103. These QAM symbols are then converted from serial to parallel at converter 104 with a block length equal to the number of subcarriers. As previously noted, an OFDM symbol has 48 data subcarriers and 4 carrier pilot subcarriers. For each block of data, the inverse Fast Fourier Transform (IFFT) 105 is calculated with a size that is larger than the number of subcarriers to make an output spectrum with low enough out-of-band radiation. The IFFT output is converted from parallel to serial at converter 106 after which the final OFDM symbol is formed at circuit 107 by adding a cyclic extension and a windowing function. The cyclic extension should be at least two times the expected delay spread in order to reduce intersymbol interference to an acceptable level. The digital data is then applied to a digital to analog converter (DAC) 108, and then to an RF transmitter 109.

In the receiver path, a signal is received by RF receiver 110, and converted into digital data by an analog to digital converter (ADC) 111. Timing and frequency synchronization is performed at circuit 112 to recover the OFDM signal, and the cyclic extensions are then removed at circuit 113. A serial to parallel conversion is made at converter 114, with the block length equal to the number of subcarriers. For each block of data, the Fast Fourier Transform (FFT) is calculated at calculator 115. The FFT output is converted from parallel to serial at converter 116 after which the QAM symbols are demapped at demapper 117. The interleaving process is reversed at deinterleaver 118, and the QAM symbols are decoded at decoder 119 into the binary output data.

Figure 3A:
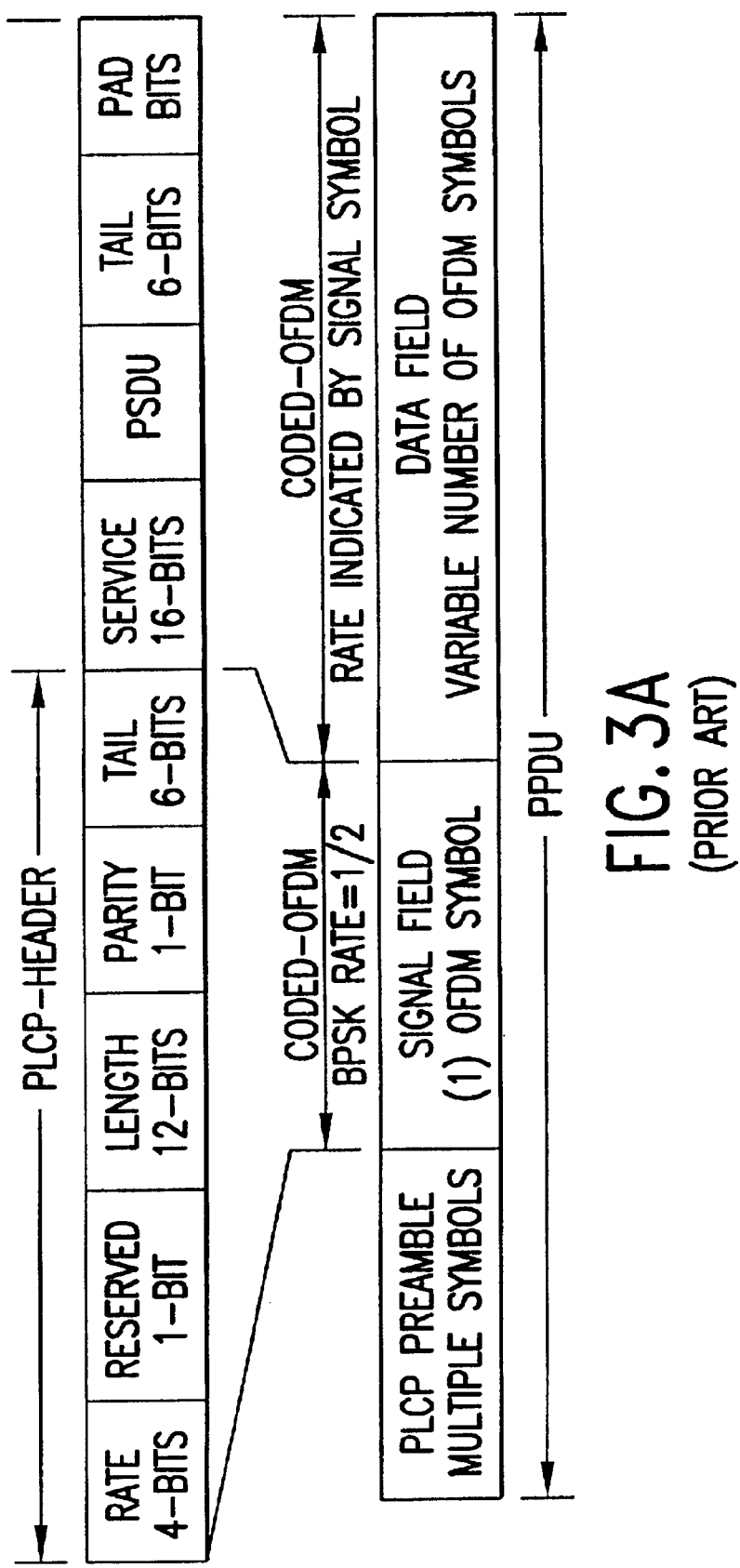
FIG. 3A is a packet structure of an OFDM frame according to the IEEE 802.11a Standard and known in the prior art.

FIG. 3A shows a packet structure of a frame in an IEEE 802.11a system. A PPDU frame consists of a PLCP preamble and signal and data fields as shown. The receiver uses the preamble to acquire the incoming OFDM signal and synchronize a demodulator in the receiver. A PLCP header contains information about the PSDU from the sending OFDM PHY. The PLCP preamble and the signal field are always transmitted at 6 Mbps, binary phase shift keying (BPSK)-OFDM modulated using a convolutional encoding rate R=½.

The PLCP preamble field is used to acquire the incoming signal and train and synchronize the receiver. The PLCP preamble is depicted in FIG. 5A and includes ten short symbols (1–10) as defined above, a medium symbol (½) as defined above, and two long symbols (1, 2) as defined above. To repeat, if the duration of each short symbol is 0.8 $\mu$s, then the medium symbol has a duration of 1.6 $\mu$s, and each long symbol has a duration of 3.2 $\mu$s. According to the prior art, the short symbols are used to train the receiver's automatic gain control (AGC) and obtain a coarse estimate of the carrier frequency and the channel. The long symbols are used to fine-tune the frequency and channel estimates. Twelve subcarriers are used for the short symbols and fifty two subcarriers for the long symbols. The training of an OFDM receiver is typically accomplished over several of the short symbols and typically not less than the duration of two short symbols. The PLCP preamble is BPSK-OFDM modulated at 6 Mbps.

The signal field is a 24-bit field which contains information about the rate and length of the PSDU. The signal field is convolutional encoded rate ½, BPSK-OFDM modulated. In the field, there are four bits (R1–R4) used to encode the rate, twelve bits are defined for the length, one reserved bit, a parity bit, and six "0" tail bits. The mandatory data rates for IEEE 802.11a-compliant systems are 6 Mbps, 12 Mbps, and 24 Mbps. The length field is an unassigned 12-bit integer that indicates the number of octets in the PSDU.

The data field contains a 16 bit service field, the PSDU, six tail bits, and pad bits. A total of six tail bits containing 0s are appended to the PPDU to ensure that the convolutional encoder is brought back to zero state. The determination of the number of bits in the data field, the number of tail bits, the number of OFDM symbols, and the number of pad bits is defined in the IEEE 802.11a Standard. The data portion of the packet is transmitted at the data rate indicated in the signal field.

All the bits transmitted by the OFDM signal in the data field are scrambled using a frame-synchronous 127-bit sequence generator. Scrambling is used to randomize the service, PSDU, pad bit, and data patterns, which may contain long strips of binary 1s or 0s. The tail bits are not scrambled. The scrambling polynomial for the OFDM PHY is: $S(x)=x^{-7}+x^{-4}+1$. The initial state of the scrambler is randomly chosen. Prior to scrambling the PPDU frame, the seven least significant bits of the service field are reset to 0 in order to estimate the initial state of the scrambler in the receiver.

All information contained in the service, PSDU, tail, and pad fields are encoded using a convolutional encoding rate of R=½, ⅔ or ¾ corresponding to the desired data rate. Convolutional encoding is generated using the following polynomials; $g_0=133_8$ and $g_1=171_8$ of rate R=½. Puncture codes are used for the higher data rates. Industry standard algorithms, such as the Viterbi algorithm, are recommended for decoding.

Figure 3B:
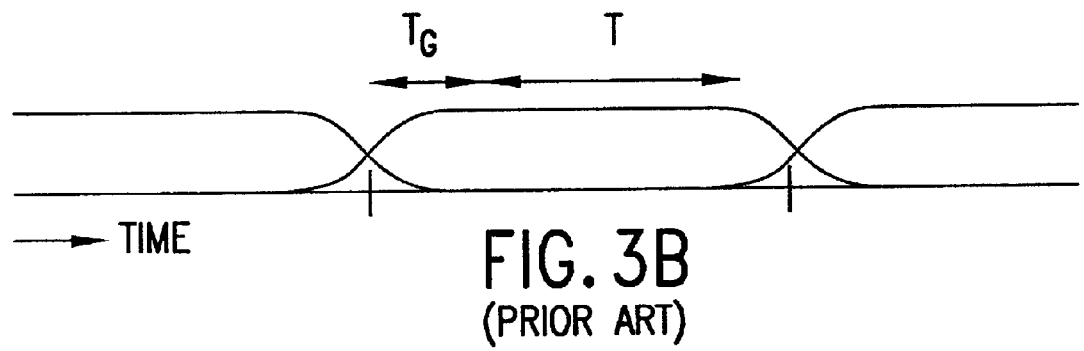
FIG. 3B is an OFDM symbol structure with a guard time and an FFT interval known in the prior art.
Figure 3C:
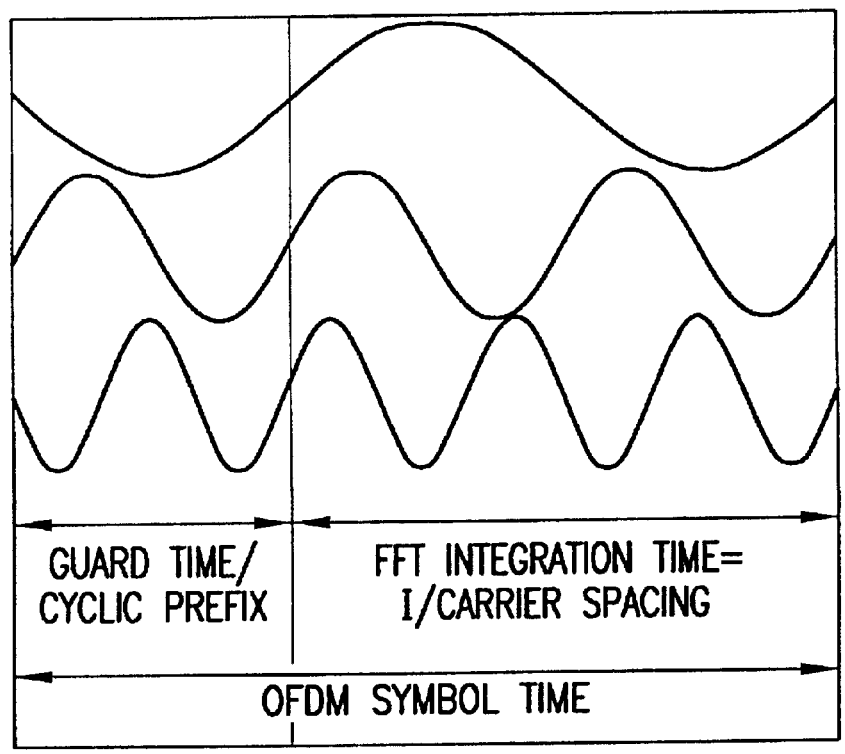
FIG. 3C is an OFDM symbol structure with three sub-carriers known in the prior art.

FIG. 3B shows the OFDM symbol structure. Here T is the FFT duration and $T_G$ is the guard time. Each OFDM symbol is windowed by a raised cosine window to reduce the out-of-band radiation. The purpose of the guard time and the cyclic prefix is to prevent both intersymbol interference (ISI) and intercarrier interference (ICI). To illustrate this, three subcarriers are depicted in more detail in FIG. 3C. An OFDM receiver uses only a part of this signal to calculate the FFT. In the FFT interval, every subcarrier has exactly an integer number of cycles, which ensures orthogonality.

For each multipath component, there will be an integer number of cycles within the FFT interval, as long as the multipath delay does not exceed the guard time. Hence, there is no interference between symbols or between subcarriers. Thanks to the guard time and cyclic prefix, the wideband multipath fading is experienced in OFDM as a set of narrowband fading subcarriers without ISI or ICI. The effect of narrowband fading is that the received subcarriers have different amplitudes, and some may be almost lost in deep fades. In order to become insensitive to such deep fades, forward error correcting coding is used. By proper coding and interleaving across the subcarriers, the OFDM link performance is dependent on the average received power, rather that the worst case lowest power in deep fades.

Figure 4:
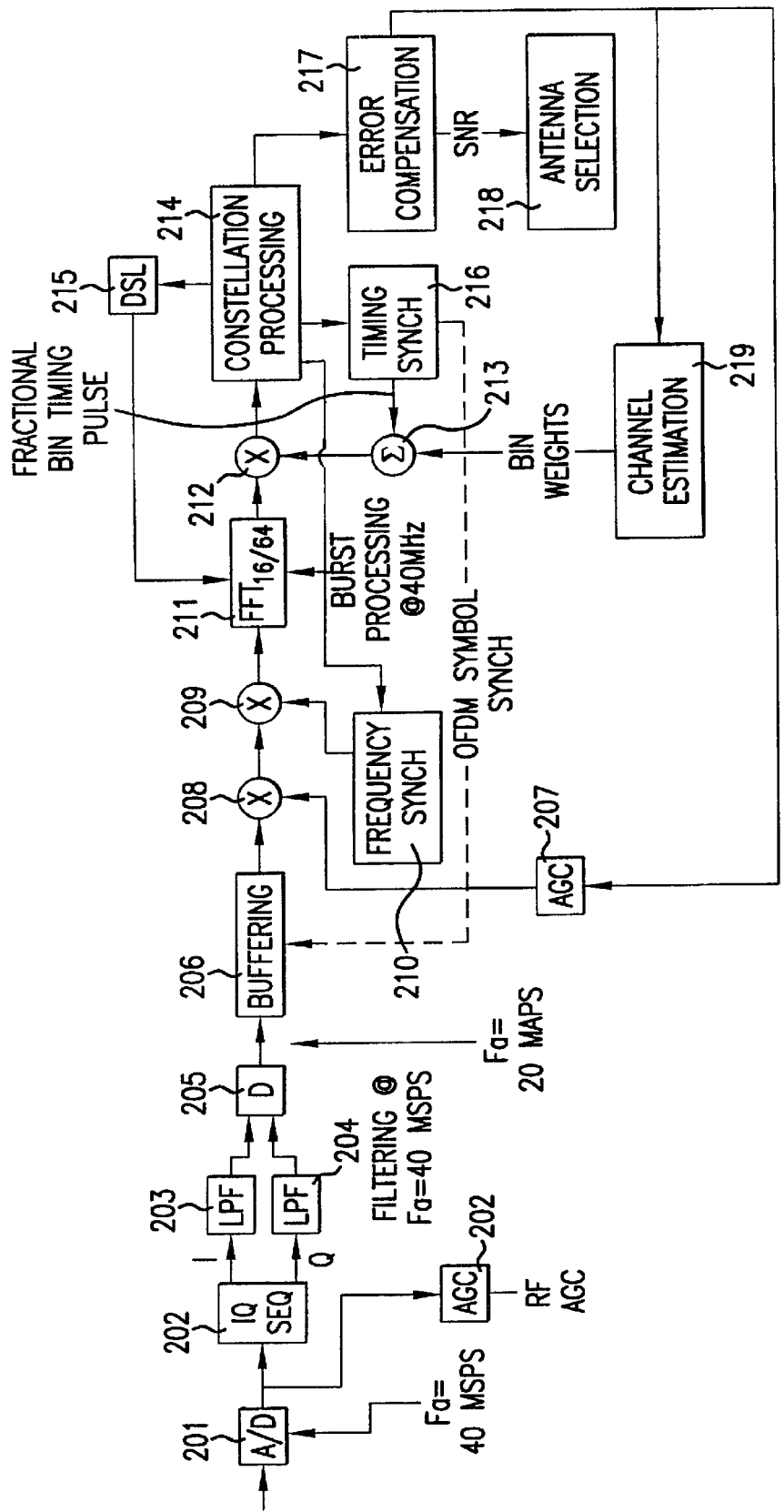
FIG. 4 is a block diagram of a signal processing and acquisition logic circuit of a receiver according to the present invention.

Turning to FIG. 4, an arrangement according to the present invention seeks to improve the timing synchronization as performed in block 112 in the prior art OFDM transceiver depicted in FIG. 2. As will be explained below, this invention achieves timing synchronization over the course of one short symbol in the preamble of a received OFDM signal, thus allowing such functions as, for example, antenna selection, to be performed reliably before the preamble has passed.

An incoming OFDM signal is input to an analog-to-digital converter (A/D) 201 which is sampled at a frequency $F_a$ of 40 million samples per second (MSPS). The sampled signal is applied to an automatic gain controller (AGC) 202 which supplies iterative feedback to an RF circuit for gain control, and is also applied to an I/Q sequencer 202' for noncoherently converting the real intermediate A/D frequency samples into I and Q signals having baseband and other frequency components. The I and Q signals are passed through low pass filters (LPF) 203, 204 for removing unwanted frequencies and forming a continuous baseband output signal of baseband I/Q channels at a 20 MHz rate.

Filtering at a sampling rate of 40 MSPS shortens the impulse response. A decimater (D) 205 reduces the sampling rate in half to 20 MSPS by removing every other sample. A buffering circuit 206 holds the short, medium and long symbols of the preamble of the OFDM received signal.

The buffer output is applied to a first multiplier 208 to which the gain of an AGC circuit 207 is applied. The output of the first multiplier 208 is applied to a second multiplier 209 to which the output of a frequency synchronizer 210 is applied. The output of the second multiplier 209 is applied to a fast Fourier transform (FFT) circuit 211 which performs a fast Fourier transform on the incoming signal at 16 or 64 complex point processing at a burst processing rate of 40 MHz. The output of the FFT circuit 211 is applied to a third multiplier 212 to which the output of a summer 213 is applied. The output of the third multiplier 212 is applied to a constellation processing circuit 214 operative for performing logical processing of 12⁄52 of the subcarriers of the short and long symbols. One output of the constellation processing circuit 214 is applied to a discriminator (DSL) 215 of short and long symbols, the output of the discriminator being fed back to the FFT circuit 211 to switch between short and long symbols.

Another output of the constellation processing circuit 214 is applied to a timing synchronizer circuit 216 in accordance with this invention which acquires the OFDM boundaries of the short and long symbols and provides a fractional bin timing pulse for output to the summer 213, and another output of circuit 214 is fed to the input of the frequency synchronizer 210.

Still another output of the constellation processing circuit 214 is applied to an error compensation circuit 217 having a first output to an antenna selection circuit 218, a second output to the AGC circuit 207 for providing iterative feedback to the FFT circuit 211 through the multiplier 208, and a third output to a channel estimation circuit 219 operative for looking at the channel in use and assigning a bin weight for application to the summer 213.

The timing synchronizer 216 of this invention has another output connected to the buffer 206 for adjusting the timing prior to reaching the FFT circuit 211. This is an integer sample timing correction. The final timing adjustment is provided after the FFT circuit 211 at the multiplier 212. This is a fractional sample timing correction.

The transformation of a signal x(i) for i=0, ... N−1

$$X(k) = \sum_{i=0}^{N-1} x(i)\exp(-jik2\pi/N) \text{ for } k = 0, \ldots N-1$$

which takes N discrete samples of the signal x(i) to N samples X(k) is called the discrete Fourier transform (DFT).

The heterodyne principle is that a shift in time of the signal x(k+m) is equivalent to a complex exponential multiplication of the transform $$x(n+m)=e^{jm(-2\pi/N)k}X(k)$$

where

X(k) is the DFT of x(n), and $X(k+m)=e^{-jm(2\pi/N)n}x(n)$.

Hence, a time delay is derived at the output of the FFT circuit 211 when multiplied by the complex exponential. The time delayed signal represented by the short symbols in the OFDM preamble can be used to estimate the time delay as a common phase rotation. This time estimate represents both the integer sample timing correction and the fractional sample timing correction.

Hence, without a prior knowledge of frequency or timing, signal samples are buffered and applied to, for example, a 16 point FFT. An average differential angle is computed according to the following equation:

$$(I + 1j \cdot Q) = \frac{1}{10} \left[ \sum_{f=1}^{f=5} smask(f) \cdot smask(f+1) \cdot FFT16_f \cdot \overline{FFT16_{f+1}} + \sum_{f=10}^{f=14} smask(f) \cdot smask(f+1) \cdot FFT16_f \cdot \overline{FFT16_{f+1}} \right]$$

where smask(f) is a masking function of the bits of the short symbols which provides sign information to map all points to the same quadrant, and where each pair of points (f, f+1) is equally spaced apart. Each pairwise combination of the product of one FFT for one point and of the conjugate FFT for the other point in a respective pair is a bin, and is summed for points 1–5 and 10–14. Points 6–9 represent noise and are not summed.

The arctangent of the average differential angle is calculated, and then scaled, in this case, by multiplying by the factor 16/360 in order to obtain the timing estimate. The integer part represents whole sample offsets or coarse timing, while the fractional part represents fine tuning.

More specifically, in contrast to the prior art in which at least the durations of at least two short symbols were used to obtain timing synchronization information, this invention proposes to use only the duration of one short symbol by subjecting the one short symbol to the Fourier transform processing of the FFT circuit 211 and by calculating the time delay or spread between a sample point and a reference point to determine the phase error.

Reference is now made to FIG. 5B which schematically depicts the processing flow during receipt of the preamble of the OFDM signal depicted in FIG. 5A. During the first short symbol, automatic gain control is performed by the AGC 202 of FIG. 4. During the second short symbol, buffering is performed by the buffer circuit 206. During the third short symbol, the Fourier transform circuit 211, the constellation processing circuit 214 and the synchronizing circuits 210, 216 perform their respective functions. This is sufficient time for an antenna to be selected by the selection circuit 218. The remaining short symbols represent a safety margin to repeat any of the foregoing functions, or to perform new ones.

In accordance with this invention, the receiver has two antennas A and B, and it is desired to choose between them. Hence, as shown in FIG. 5B, the second antenna B can be processed during short symbols 3, 4 and 5 with an overlap during short symbol 3. The selection between antennas A and B occurs during short symbol 6. This leaves short symbols 7–10 as a safety margin to repeat any of the foregoing functions, or to perform new ones. Again, this is accomplished because only the duration of one short symbol is needed to achieve timing synchronization.

For completeness, FIG. 5B depicts that, during the medium symbol, the discrimination between short and long symbols is performed by the DSL circuit 215. The two long symbols are used to refine timing, frequency and channel estimates.

The faster timing synchronization of this invention can be used for other functions different from antenna selection. For example, higher order constellation processing could be performed by circuit 214, or a longer range could be acquired for the antenna, or the signal to noise ratio generated by the error compensation circuit 217 could be increased.

It will be understood that each of the elements described above, or two or more together, also may find a useful application in other types of constructions differing from the types described above.

While the invention has been illustrated and described as embodied in timing synchronization in OFDM communications receivers, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. A method of synchronizing a receiver to a received orthogonal frequency division multiplexing (OFDM) signal having a preamble with short and long duration symbols, comprising the steps of:
   a) converting the received OFDM signal by Fourier transform to frequency domain components;
   b) processing the frequency domain components to timing components;
   c) deriving timing information from the timing components;
   d) applying the timing information to the received OFDM signal to synchronize the receiver; and
   e) all of said steps being performed during one of the short symbols.

2. The method of claim 1; and further comprising the step of buffering the received OFDM signal during another of the short symbols to obtain a buffered signal.

3. The method of claim 2; and further comprising the step of automatically controlling the gain of the received OFDM signal during still another of the short symbols.

4. The method of claim 3; and further comprising the step of selecting an antenna for the receiver during three of the short symbols.

5. The method of claim 2, wherein the applying step is performed by applying the timing information to the buffered signal.

6. The method of claim 5, wherein the deriving step is performed by generating fractional timing information from the timing components, and wherein the applying step is performed by applying the fractional timing information to the frequency domain components.

7. A method of antenna selection in a dual antenna receiver for receiving an orthogonal frequency division multiplexing (OFDM) signal having a preamble with short and long duration symbols, comprising the steps of:
   a) converting an OFDM signal received by a first antenna by Fourier transform to frequency domain components;
   b) processing the frequency domain components to timing components;
   c) deriving timing information from the timing components;

d) applying the timing information to the received OFDM signal to synchronize the receiver;

e) analyzing a signal-to-noise ratio (SNR) of the OFDM signal received by the first antenna of the synchronized receiver during one of the short symbols;

f) repeating steps a) through e) for a second antenna during another of the short symbols; and g) selecting the antenna which has a higher SNR during another of the short symbols.

8. The method of claim 7, wherein the step of selecting the antenna with the higher SNR is performed in no more than six of the short symbols.

9. An arrangement for synchronizing a receiver to a received orthogonal frequency division multiplexing (OFDM) signal having a preamble with short and long duration symbols, comprising:

a) a Fourier transform (FT) circuit for converting the received OFDM signal to frequency domain components;

b) a constellation processing (CP) circuit connected to the FT circuit, for processing the frequency domain components to timing components; and c) a timing synchronizing circuit connected to the CP circuit, and operative for deriving timing information from the timing components, and for applying the timing information to the received OFDM signal to synchronize the receiver during one of the short symbols.

10. The arrangement of claim 9; and further comprising an automatic gain control circuit for controlling the gain of the received OFDM signal during another of the short symbols.

11. The arrangement of claim 10; and further comprising a buffer circuit connected to the gain control circuit, for buffering the received OFDM signal.

12. The arrangement of claim 11, wherein the timing synchronizing circuit is connected to the buffer circuit, for applying the timing information to the buffer circuit.

13. The arrangement of claim 12, wherein the timing synchronizing circuit is operative for generating and applying fractional timing information to a multiplier connected between the FT and CP circuits.

* * * * *